3,539,462

AZEOTROPIC COMPOSITION

J. Allan Schofield, Irvington, N.Y., assignor to Union Carbide Corporation, New York, N.Y., a corporation of New York No Drawing. Continuation-in-part of application Ser. No. 661,847, Aug. 21, 1967. This application Oct. 17, 1968, Ser. No. 768,522
Int. Cl. C09d 9/00; C11d 7/50; C23g 5/02
U.S. Cl. 252—170 2 Claims

ABSTRACT OF THE DISCLOSURE

The disclosure relates to azeotropic mixtures of trichlorotrifluoroethane dichloroethane and isopropanol.

This application is a continuation-in-part of U.S. Pat. Application Ser. No. 661,847, filed Aug. 21, 1967 and now abandoned.

This invention relates to an azeotropic composition and particularly to the azeotropic mixture of trichlorotrifluoroethane; dichloroethane and methanol or ethanol or isopropanol or tertiary butanol or 2,2-dimethyl butane or 2,3-dimethyl butane.

Chlorofluoroethane solvents known in the art ordinarily do not have sufficient solvent power to clean "printed circuit boards"; that is, to effectively remove the rosin flux and other contaminants deposited on the surface of such boards during the application of conductive metal leads thereto. Ultrasonic or vapor degreasing techniques may be used to improve the cleaning action of such solvents. Although mixtures of solvents have been used for this purpose they have the disadvantage that they boil over a range of temperatures and consequently undergo fractionation in vapor degreasing or ultrasonic applications which are open to the atmosphere. Additionally, when employing either of these methods the solvent must also be relatively nontoxic and nonflammable for safety reasons.

For certain solvent purposes some chlorofluoroethanes by themselves have insufficient solvent power. For example, in cleaning printed circuit boards trichlorotrifluoroethane does not have sufficient cleaning or solvency power to remove the flux, such as rosin which is employed in depositing metal conductors to the circuit board. Other solvents such as dichloroethane is too strong a solvent and tends to cause the circuit board to warp, swell or distort, which could in some instances lead to breaking of the conductor(s) on the board. Although mixtures of solvents may be used for cleaning circuit boards they suffer the disadvantage that they boil over a range of temperatures and consequently undergo fractionation in vapor degreasing or ultrasonic applications which are open to the atmosphere. When employing either of these methods the solvents must also be substantially non-toxic for safety reasons.

It is an object of this invention to provide a constant boiling or azeotropic solvent that is a liquid at room temperature, will not fractionate and also has the foregoing advantages. Another object is to provide an azeotropic composition which is valuable as a solvent for oils and greases particularly for cleaning printed circuits. A further object is to provide an azeotropic composition which is both relatively nontoxic both in the liquid phase and in the vapor phase and which at the same time is an excellent solvent for cleaning printed circuits especially by continuous degreasing or ultrasonic means.

The above object of this invention may be accomplished by novel mixtures comprising a three component composition of trichlorotrifluoroethane (e.g. 1,1,2-trichloro-1,2,2-trifluoroethane) as a first component, 1,1-dichloroethane as a second component and either methanol or ethanol or isopropanol or tertiary butanol or 2,2-dimethyl butane or 2,3-dimethyl butane as a third component. Although 1,1,2-trichloro-1,2,2-trifluoroethane is a preferred trichlorotrifluoroethane component, the isomer 1,1,1-trichloro-2,2,2-trifluoroethane may be substituted as a component therefore in whole or in part and especially in minor amounts or trace amounts. All of these mixtures form azeotropes which distill at a constant temperature, the liquid phase and the vapor phase in equilibrium therewith having the same composition. Such mixtures are relatively nontoxic in both the liquid phase and the vapor phase. These mixtures are particularly useful as solvents for greases, oils, waxes and the like and are particularly useful for cleaning printed circuits.

Although the azeotropic mixtures are obtained at approximately 160 mm. Hg a variation in pressure and consequentialy a change in the compositions and boiling points are also intended to be within the broad scope of the invention. Thus the azeotropes may contain many different proportions of the aforementioned components provided a constant boiling mixture is obtained at the various pressures at which the compositions are used. Stated otherwise any pressure may may be employed to obtain the azeotropes of this invention as long as a three component constant boiling mixture is obtained, and accordingly the ratio of components of the azeotropes of the invention will also vary. The variation of components is thus within the skill of the art and is easily determined once it is known that the mixture of components of this invention will form the aforementioned azeotropes. In a preferred embodiment the present invention relates to the aforementioned azeotropes that boil at atmospheric pressure ± about 25, especially ± about 15 mm. Hg.

Azeotropic mixtures were obtained in the course of distillation of a mixture of 1,1,2-trichloro-1,2,2-trifluoroethane; 1,1-dichloroethane and methanol or ethanol or isopropanol or tertiary butanol or 2,2-dimethyl butane or 2,3-dimethyl butane. The mixtures are charged to a laboratory distillation flask provided with an overhead condenser for the removal of distillate. The mixtures are heated to its atmospheric boiling point and distilled at high reflux. The azeotropic mixture is removed consisting essentially of the following compositions as determined by vapor phase chromatography the boiling points of which are measured at substantially 760 millimeter Hg pressure:

TABLE I

| Examples | Components | Composition, percent by weight | Boiling point, ° F.~760 mm. Hg |
|---|---|---|---|
| 1 | 1,1,2-trichloro-1,2,2-trifluoroethane | 90.1 | 102.7 |
| | 1,1-dichloroethane | 4.2 | |
| | Methanol | 5.7 | |
| 2 | 1,1-trichloro-1,2,2-trifluoroethane | 86.4 | 111.0 |
| | 1,1-dichloroethane | 8.6 | |
| | Ethanol | 5.1 | |
| 3 | 1,1,2-trichloro-1,2,2-trifluoroethane | 85.7 | 115.0 |
| | 1,1-dichloroethane | 11.4 | |
| | Isopropanol | 2.9 | |
| 4 | 1,1,2-trichloro-1,2,2-trifluoroethane | 84.8 | 115.6 |
| | 1,1-dichloroethane | 1.0 | |
| | Tert-butanol | 14.2 | |
| 5 | 1,1,2-trichloro-1,2,2-trifluoroethane | 65.6 | 114.3 |
| | 1,1-dichloroethane | 15.5 | |
| | 2,2-dimethyl butane | 18.9 | |
| 6 | 1,1,2-trichloro-1,2,2-trifluoroethane | 78.9 | 115.8 |
| | 1,1-dichloroethane | 15.2 | |
| | 2,3-dimethyl butane | 5.9 | |

Although the azeotropes are obtained at approximately 760 mm. Hg a variation in pressure and consequently a change in the compositions and boiling points are also intended to be within the broad scope of the invention. Thus the azeotropes may contain many proportions of all three of the components of the foregoing examples provided a constant boiling mixture is obtained at the various pressures at which the compositions are used. Stated otherwise any pressure may be employed to obtain the azeotropes of this invention as long as a three component constant boiling mixture is obtained, and accordingly the ratio of components of the azeotropes of the invention will also vary. The variation of components is thus within the skill of the art and is easily determined once it is known that the halogenated hydrocarbons of the examples will form azeotropes with methanol or ethanol or isopropanol or tertiary butanol or 2,2-dimethyl butane or 2,3-dimethyl butane. In a preferred embodiment, the present invention relates to the azeotropic components of ± about 5 and especially ± about 15 mm. Hg. Although 1,1,2-trichloro-1,2,2-trifluoroethane is employed as a preferred compound the isomer 1,1,1-trichloro-2,2,2-trifluoroethane may be substituted therefore in whole or in part especially in minor amounts.

Because of this variation in boiling temperature due to a change in pressure the mixtures of the present invention may vary in composition especially the azeotropic mixtures. Accordingly, the compositions of the present invention comprises mixtures of trichlorotrifluoroethane (e.g. 1,1,2-trichloro-1,2,2-trifluoroethane and 1,1-dichloroethane) and the other components of this invention as follows:

TABLE II

| | Components | Composition, weight basis |
|---|---|---|
| (1) | 1,1,2-trichloro-1,2,2-trifluoroethane | About 90.1±about 10%, especially±about 5%. |
| | 1,1-dichloroethane | About 4.2±about 10%, especially±about 5%. |
| | Methanol | About 5.7±about 10%, especially±about 5%. |
| (2) | 1,1,2-trichloro-1,2,2-trifluoroethane | About 86.4±about 10%, especially±about 5%. |
| | 1,1-dichloroethane | About 8.6±about 10%, especially±about 5%. |
| | Ethanol | About 5.1±about 10%, especially±about 5%. |
| (3) | 1,1,2-trichloro-1,2,2-trifluoroethane | About 85.7±about 10%, especially±about 5%. |
| | 1,1-dichloroethane | About 11.4±about 10%, especially±about 5%. |
| | Isopropanol | About 2.9±about 10%, especially±about 5%. |
| (4) | 1,1,2-trichloro-1,2,2-trifluoroethane | About 84.8±about 10%, especially±about 5%. |
| | 1,1-dichloroethane | About 1.0±about 10%, especially±about 5%. |
| | Tert-butanol | About 14.2±about 10%, especially±about 5%. |
| (5) | 1,1,2-trichloro-1,2,2-trifluoroethane | About 65.6±about 10%, especially±about 5%. |
| | 1,1-dichloroethane | About 15.5±about 10%, especially±about 5%. |
| | 2,2-dimethyl butane | About 18.9±about 10%, especially±about 5%. |
| (6) | 1,1,2-trichloro-1,2,2-trifluoroethane | About 78.9±about 10%, especially±about 5%. |
| | 1,1-dichloroethane | About 15.2±about 10%, especially±about 5%. |
| | 2,3-dimethyl butane | About 5.9±about 10%, especially±about 5%. |

Although the foregoing Table II refers to 1,1,2-trichloro-1,2,2-trifluoroethane, it is also applicable to trichlorotrifluoroethanes as described previously herein.

A printed circuit board coated with a rosin flux is cleaned in an ultrasonic degreasing apparatus with the mixtures of this invention and substantially all of the rosin flux is removed without any observable effect on the board which constitutes the backing of the printed circuit.

When the board is cleaned with 1,1,2-trichloro-1,2,2-trifluoroethane alone a considerable amount of rosin flux remains after treatment. On the other hand, if the board is cleaned with 1,1-dichloroethane alone, even though the rosin flux is substantially removed, the board itself may be considerably damaged. However, if the board is treated with the azeotropic compositions of this invention substantially all of the rosin flux is removed without any detrimental effect on the board which constitutes the backing of the printed circuit.

The azeotropes of the present invention are unexpected especially in view of the fact that the following ternary and binary mixtures were not found to form azeotropes:

TABLE III.—TERNARY MIXTURES THAT DO NOT FORM AZEOTROPES

| | | | |
|---|---|---|---|
| (1) | Solvent 113 [1] | Methylene chloride | Chloroform. |
| (2) | do.[1] | do | Carbon tetrachloride. |
| (3) | do.[1] | do | Isopropanol. |
| (4) | do.[1] | do | Methyl acetate. |
| (5) | do.[1] | do | Acetone. |
| (6) | do.[1] | 1,1-dichloroethane | Methyl acetate. |
| (7) | do.[1] | do | Sec-butanol. |
| (8) | do.[1] | do | Cyclopentane. |
| (9) | do.[1] | do | n-Butanol. |
| (10) | do.[1] | do | Methylformate. |
| (11) | do.[1] | do | i-Butanol. |
| (12) | do.[1] | 1,2-dichloroethane | Methanol. |
| (13) | do.[1] | do | Ethanol. |
| (14) | do.[1] | do | Isopropanol. |

[1] 1,1,2-trichloro-1,2,2-trifluoroethane.

TABLE IV.—BINARY MIXTURES THAT DO NOT FORM AZEOTROPES

| | |
|---|---|
| Solvent 113 [1] | Benzene. |
| | n-Butanol. |
| | Sec-butanol. |
| | Iso-butanol. |
| | n-Butyl chloride. |
| | Sec-butyl chloride. |
| | 1,2-dichloroethane. |
| | Cis-1,2-dichloroethylene. |
| | 1,2-dichloro-1-fluoroethane. |
| | 2,3-dimethyl butane. |
| | Ethyl ether. |
| | Trichloromonofluoromethane. |
| | Tetrachlorodifluoroethane. |
| | Furan. |
| | Hexane. |
| | Isopentane. |
| | Isopropylchloride. |
| | Methyl ethyl ketone. |
| | 2-methylpentane. |
| | Normal pentane. |
| | 1,1,1-trichloroethane. |

[1] 1,1,2-trichloro-1,2,2-trifluoroethane.

Although the invention has been described by reference to some preferred embodiments it is not intended that the broad scope of the novel azeotropic compositions be limited thereby but that certain modifications are intended to be included within the spirit and broad scope of the following claims.

These claims cover the novel embodiments of the present invention especially the substantially non-toxic mixtures noted in each. It is also intended that they cover the substantially non-flammable mixtures of Examples 1–4 and 6 as well as the broad composition limits which apply to these substantially non-flammable compositions. In the following claims it is also intended that the compositions contained therein and those of Table II herein be construed in such a manner so that for example 1,1,2-trichloro-1,2,2-trifluoroethane in an amount of about 90.1 parts ± about 10% shall mean about 99.1 parts to about 81.09 parts of such halo carbon on a weight basis and likewise for the other components given in Table II and noted in the claims as well as their equivalents especially those equivalents noted herein.

What is claimed is:

1. An azeotropic composition consisting essentially of about 85.7 parts by weight of 1,1,2-trichloro-1,2,2-trifluoroethane, about 11.4 parts by weight of 1,1-dichloroethane and about 2.9 parts by weight of isopropanol.

2. A method for cleaning a solid surface comprising contacting said surface with the composition of claim 1.

References Cited

UNITED STATES PATENTS 2,999,816 9/1961 Bennett et al. -------- 252—170

OTHER REFERENCES

Mellan: Industrial Solvents, 2nd ed. (1950) Reinhold Publ. Co., pp.73–75.

Rose: Cond. Chem. Dict., 6th ed. (1961) Reinhold Publ. Co., p. 472.

LEON D. ROSDOL, Primary Examiner

W. E. SCHULZ, Assistant Examiner

U.S. Cl. X.R.

106—311; 252—364